United States Patent [19]

Corley

[11] 4,327,843

[45] May 4, 1982

[54] CUP DISPENSING MECHANISM

[76] Inventor: Dewey A. Corley, Rte. 9, Sevierville, Tenn. 37862

[21] Appl. No.: 153,051

[22] Filed: May 27, 1980

[51] Int. Cl.³ ............................................. B65G 59/00
[52] U.S. Cl. .................................... 221/210; 221/262; 221/223; 221/251; 221/267; 414/128
[58] Field of Search ............... 221/262, 195, 210, 221, 221/223, 251, 267, 273, 303; 414/128

[56] References Cited

U.S. PATENT DOCUMENTS

| | | |
|---|---|---|
| 1,229,852 | 6/1917 | Abernathy . |
| 1,609,581 | 12/1926 | Smith . |
| 1,623,353 | 4/1927 | McCarthy . |
| 1,657,879 | 1/1928 | Carle . |
| 2,624,647 | 1/1953 | Lawson ............................ 221/221 |

*Primary Examiner*—Allen N. Knowles

*Attorney, Agent, or Firm*—Luedeka & Fitch

[57] ABSTRACT

A dispensing mechanism for singularly removing a cup from the bottom of a vertically nested stack of cups in a hopper is described. This mechanism, designed principally for beverage vending machines, has a pair of co-acting jaws which each contact nearly one-half the periphery of the cup. Each jaw has sufficient flexibility to fully conform to the cup contour thereby grasping cups having varying dimensions. After the cup is grasped, the jaws are moved axially with respect to the cup to withdraw the cup from the stack. The jaws then open to release the cup and return to their initial position to be ready to grasp the next cup. A plurality of resiliently-biased fingers placed about the bottom of the hopper hold the stack of cups; however, when a cup is drawn away, they retract sufficiently to release that cup but grasp the next cup beneath the lip thereof.

9 Claims, 11 Drawing Figures

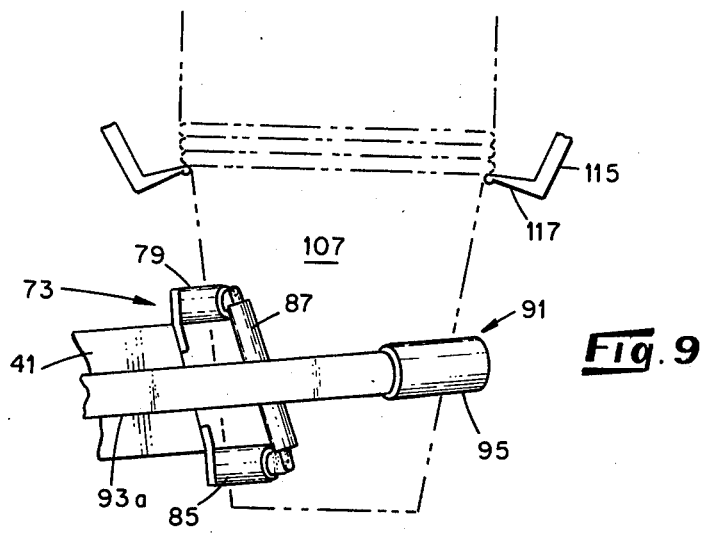
Fig. 9
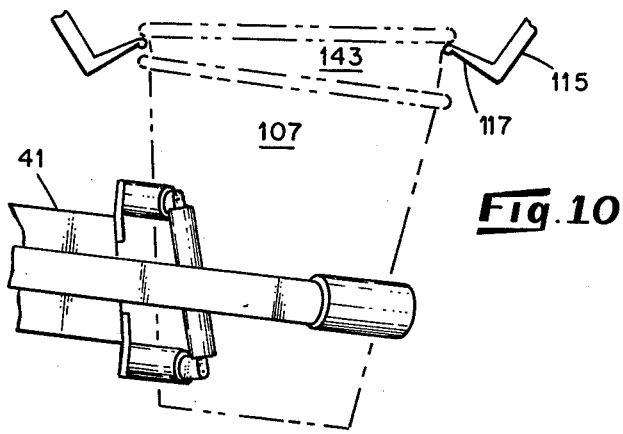
Fig. 10
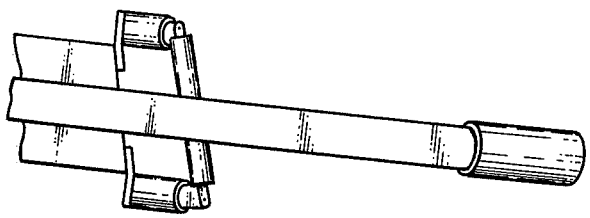
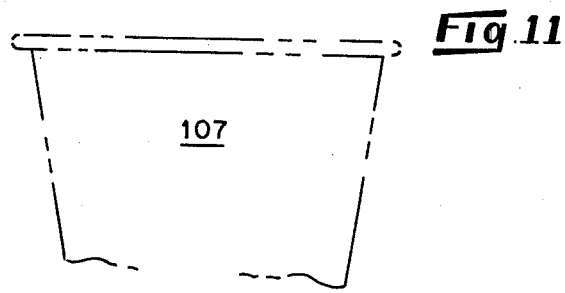
Fig. 11

CUP DISPENSING MECHANISM

This invention relates generally to article dispensing equipment and more particularly to apparatus for the dispensing of beverage cups and the like in vending machines.

Vending machines are used extensively for providing food products, principally beverages, to the consuming public. Upon the deposit of the proper coin, and depression of a selection button, a cup is dispensed from a vertical stack of nested cups to a delivery station to receive the selected product. Many systems have been utilized to dispense a single cup from the stack. Most of these can be classified into two types: systems that operate primarily at the cup lips to separate the lowermost cup from the other cups in the stack; and those that grip the body of the lowermost cup and pull that cup from the stack.

Despite the effort that has gone into cup dispensing mechanisms, improper delivery of cups remains one of the major problems encountered in the vending industry. Typical of the problems that occur are: no cup delivery, multiple cup delivery, and occasionally delivery in an orientation preventing the proper filling of the cup. Many of the malfunctions can be attributed to the cups themselves. The cups are fabricated from a variety of materials. There are paper cups, wax-impregnated paper cups, plastic cups, etc. In addition, there are differences in diameter, length, weight and rim sizes among the various brands of a given type of cup. Furthermore, there are even differences, due to manufacturing tolerances, within a given brand. The dispensing mechanism of each vending machine must be adjusted to accommodate a particular type of cup, and then be readjusted if another cup is substituted.

Accordingly, it is a principal object of this invention to provide a mechanism to select a single cup from a vertical stack of cups and deliver the cup to a food-loading location.

It is another object to provide a cup dispensing mechanism for vending machines that is not sensitive to moderate variations in cup sizes and materials of construction.

Other objects and advantages of the invention will become known by reference to the following description and the accompanying drawings in which:

FIG. 9 is an elevational view of the gripping jaws of the dispenser of FIG. 1 upon initial contact with a cup;

FIG. 10 is an elevational view of the gripping jaws after removing a cup from a stack of cups; and FIG. 11 is an elevational view of the gripping jaws of the dispenser of FIG. 1 upon release of a cup and prior to a return of the jaws to a point of beginning in the dispensing cycle.

In general, the illustrated embodiment of the invention includes mechanism for positively separating a single cup from a stack of cups and then releasing the cup for gravity feed to a filling position. In its broadest form, the mechanism has a pair of opposed jaws. Each of the jaws has sufficient flexibility to be self-contouring to the surface of the cup and to embrace nearly one half the circumference of the cup. The term "self contouring", as used herein applies to the characteristic of the jaws in that their contour is automatically adjusted during the cup-grasping step to conform to the contour of the cup. Independent, but coordinated, operating means are provided for moving the jaws together and apart so as to grasp, and later release, each cup. Further, means are provided to move the jaws away from the hopper in unison, after a cup is grasped, to separate the cup from the stack, and then to return the jaws to the beginning point after the cup is released.

The total depicted embodiment includes a cup storage hopper, with the lowermost cup in the hopper being releasably held in position by radially-displaceable lugs or the like. The two self contouring jaws are positioned adjacent to the lowermost cup, at about the same elevation and on opposing sides of the cup. When a cup is to be removed from the hopper, the jaws are moved toward each other to lightly contact the exterior surface of the cup. The jaw actuating means moves an additional distance, causing one of the jaws to conform to the contour and causing the second jaw to conform to the cup contour. In this position the jaws cooperatively contact a substantial portion of a periphery around the cup.

With the cup thus grasped, downward motion of the jaws generally along the longitudinal axis of the hopper causes the grasped cup to be pulled from the constraints of the lugs. The lugs then return to grasp the next succeeding cup in the hopper. The jaws are then spread apart to release the cup, which drops by gravity to a desired filling position or the like.

A specific embodiment of a dispensing mechanism within the scope of the invention is illustrated in FIGS. 1 through 8, and the operating sequence thereof is illustrated in FIGS. 9 through 11.

Figure 1:
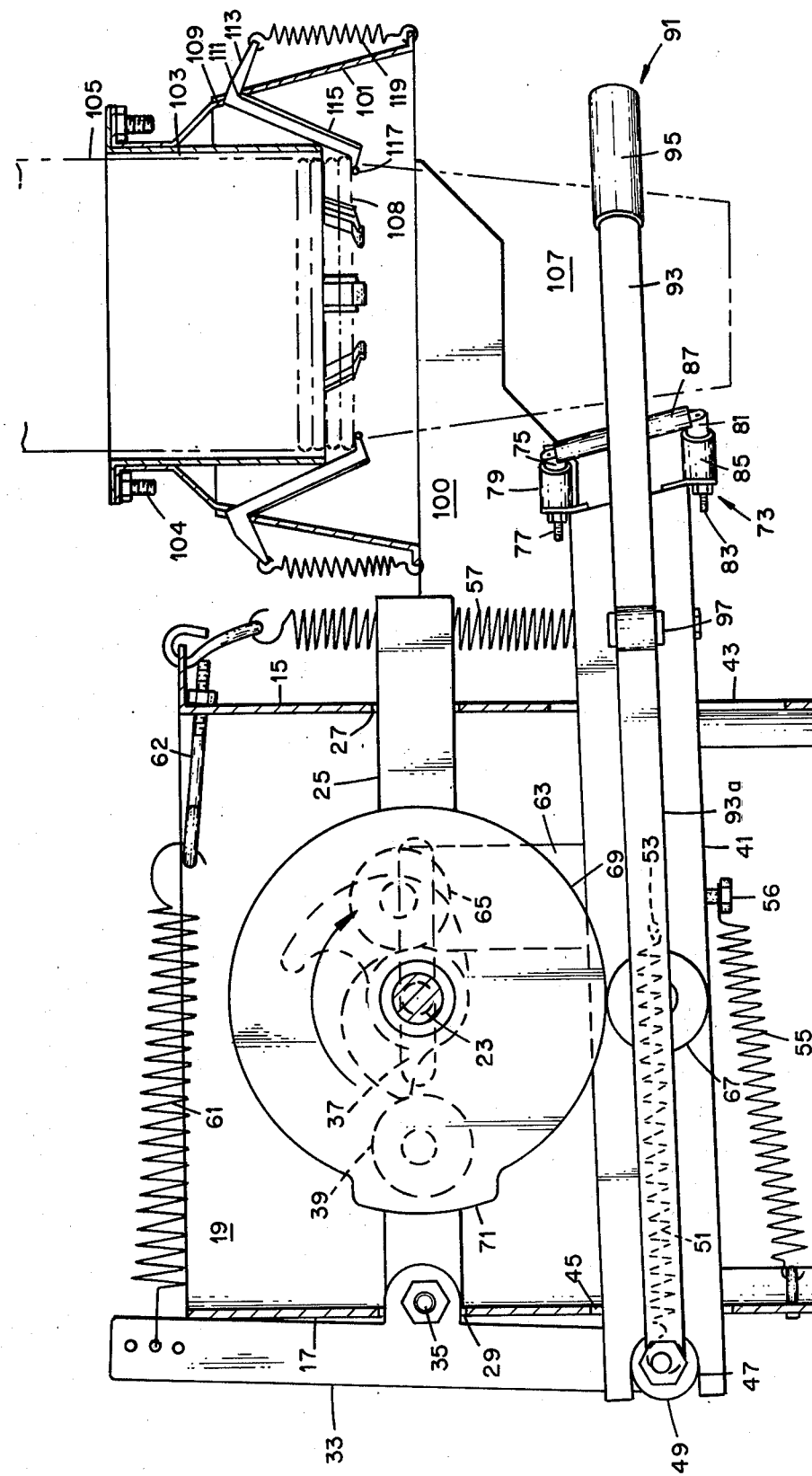
FIG. 1 is a partially sectional, elevational view of a cup dispenser embodying various of the features of the invention.
Figure 2:
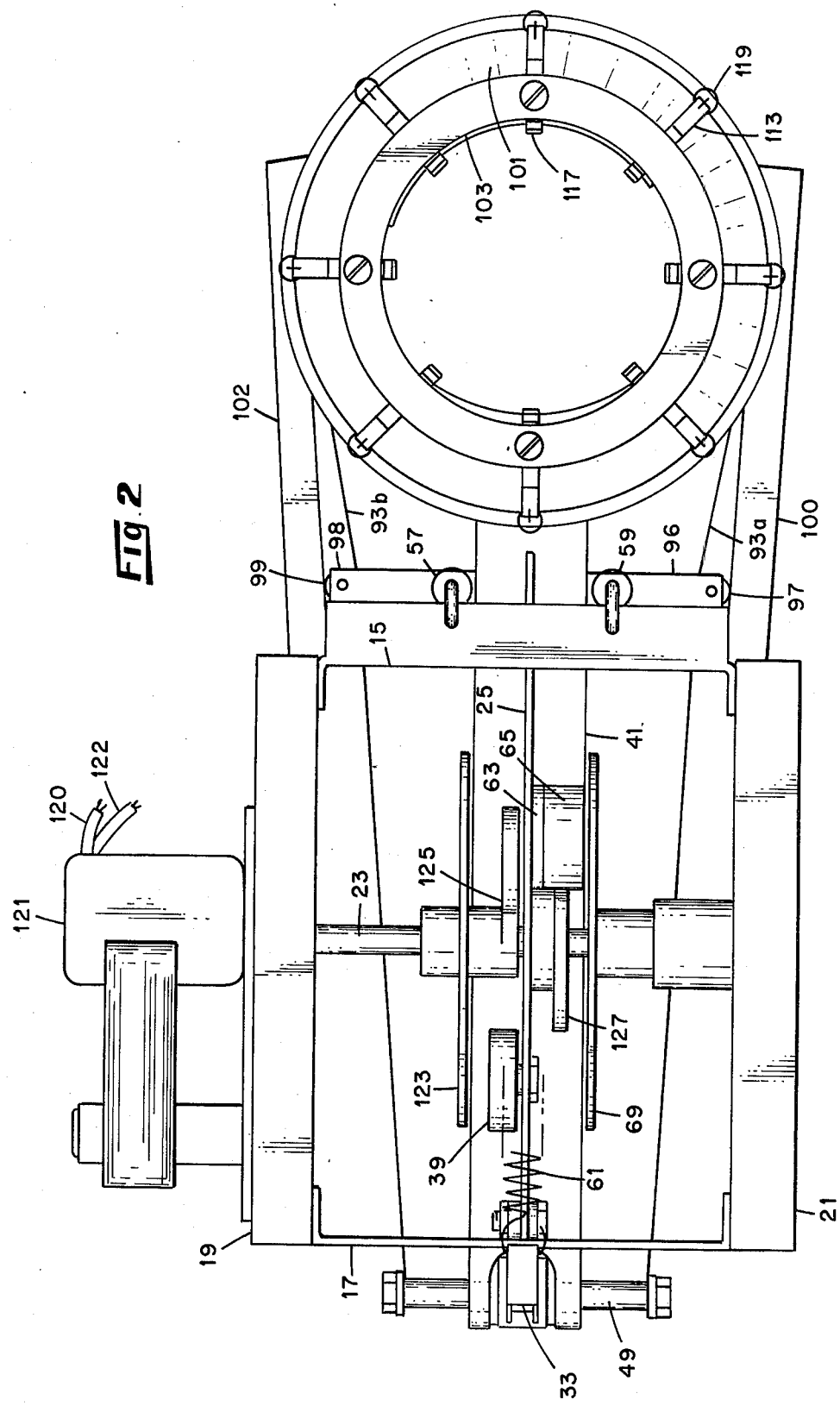
FIG. 2 is a top view of the cup dispenser shown in FIG. 1 indicating the position of rotary cam units for jaw operation.

A side view of this embodiment is shown, partly in section, in FIG. 1. A box-like frame for enclosing a major portion of the jaw-operating components is fabricated from a front wall 15, a rear wall 17 and side walls 19, 21 (wall 21 is shown in FIG. 2). The walls may be joined using one of several conventional technologies, e.g., threaded fasteners, welds, interlocking components, etc. A horizontal drive shaft 23 extends across the frame and is journaled in bearings (not shown) in the side walls 19, 21; the shaft 23 extending outwardly from side wall 19 by a distance sufficient to permit coupling to a driving unit. A number of cam elements, as described hereinbelow, are attached to the shaft 23 within the frame for rotation by the shaft to accomplish the desired jaw movements.

A first reciprocatable beam 25 associated with jaw operating components extends beyond both the front wall 15 and the rear wall 17 through guide openings 27, 29, respectively. The beam 25 carries a rotatable cam follower 39. The end of the beam 25 which passes through the rear wall 17 is joined to a vertical lever 33 (see FIG. 3) with a pivot 35. The beam 25 is provided with a slot 37, the aforementioned shaft 23 passing through this slot whereby the axis of the shaft 23 and that of the cam follower 39 are in a common horizontal plane.

A second reciprocatable beam 41 associated with the jaw operating components extends beyond both the front wall 15 and the rear wall 17 through guide openings 43, 45, respectively. The beam 41 in this embodiment is an open channel. The rearward end of beam 41 is provided with axial U-shaped notches 47 adapted to accept a cross member 49 attached to the lower end of the lever 33 permitting relative movement of the beam 41 and the cross member 49. Positioned within beam 41 is a coil spring 51 that is connected between the cross member 49 and an anchor pin 53 passing through the beam 41. The spring 51 normally retains the cross member 49 in the notches 47 of the beam 41. A second coil spring 55 is connected between the beam 41, at fastener 56, and the rear wall 17 for biasing the beam 41 to its most rearward position. Other coil springs 57, 59 (spring 59 is shown in FIG. 2) connect between the forward end of the beam 41 and the frame at the front wall 15 to bias the beam 41 upwardly to a substantially horizontal position, but permitting tilting motion of the beam 41 when desired. An additional coil spring 61 joins the top of the lever 33 to the frame at the frt wall 15 so as to bias the lever 33 against the rear wall 17 but permit departure when needed. The tension on the spring 61 is adjustable with the threaded member 62.

Figure 5:
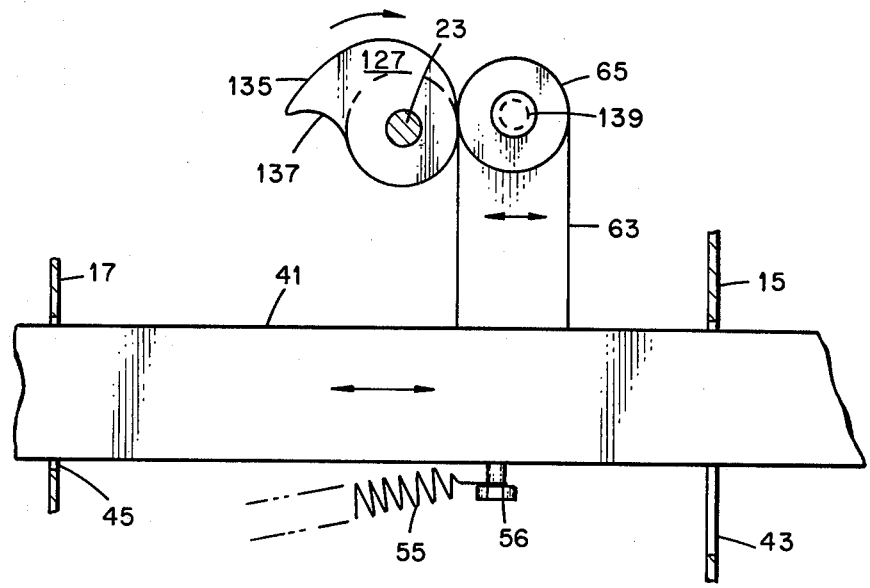
FIG. 5 is a drawing illustrating cam mechanism for actuating the second gripping jaw of the dispenser.

The beam 41 is provided with an upstanding arm 63 upon which is mounted, at its upper end, a rotatable cam follower 65 at a level of the shaft 23 for contact with a cam (see FIG. 5). Another rotatable cam follower 67 is mounted on the side surface of the beam 41 beneath the shaft 23 for contact with a plate cam 69 having a single lobe 71.

A first self-contouring jaw 73 is attached transversely to the forward end of the beam 41. In this embodiment an upper portion of this jaw has a flexible core 75 in the form of a metal band attached to the beam 41 with a fastener 77. The core 75 is encased in a resilient sleeve 79 to improve grasp upon a cup. A lower portion of the jaw 73, vertically spaced from the upper portion, is fabricated in a similar manner: a flexible core 81, attached to the beam 41 with a fastener 83, is surrounded with a resilient sleeve 85. Both core elements 75, 81 are arcuate in shape, having a radius of curvature (in a forward direction) greater than that of a cup to be grasped by the jaws. It may be seen that the upper and lower portions of the jaw 73 are axially displaced, one from the other, with respect to the beam 41. This displacement is such as to provide simultaneous contact of both portions with the tapered wall of a cup. The ends of the cores 75 and 81 are joined with cylindrical members 87 and 89. In some embodiments, jaw 73 may be fabricated of only one encased core member; however, the two core members as shown provide stability to a cup grapsed by the jaws.

A second self-contouring jaw 91 is positioned in a horizontal plane midway of the upper and lower portions of the jaw 73 to more securely grasp a cup. This second jaw 91 has an elongated flexible core 93, e.g., in the form of a metal band, partially covered with a resilient sleeve 95 where contact is made with a cup. The core 93, like the cores 75, 81, is flexible only in a substantially horizontal plane, and is non-elastic. This core 93 is provided with extensions 93a and 93b which extend under guide rollers 97, 99 (roller 99 is shown in FIG. 2) mounted on supports 96, 98 (see FIG. 2) extending from the sides of the beam 41. The end of each extension 93a, 93b is fastened to separate ends of the cross member 49. Thus it is apparent that both of the jaws 73 and 91 are attached to the beam 41, so that vertical motion of the beam 41 causes the jaws 73 and 91 to simultaneously lower and rise.

Two forward extensions 100, 102 (see FIG. 2) from the side walls 19, 21 support, and are attached to, an inverted frustoconical shell 101. A vertical cylindrical hopper 103 is attached at the top of the shell 101, as with threaded fasteners 104, for holding a stack of cups 105. The bottom cup of the stack is indicated at 107. A plurality of openings 109 that are equally spaced about the periphery of the shell 101 provide pivot fulcrums 111 for an equal number of L-shaped levers having a shorter portion 113 extending exterior to the shell 101 and a longer portion 115 interior the shell 101 and extending below the base of the hopper 103. These longer portions 115 are terminated with radially-inwardly directed fingers or lugs 117 so as to engage the cup 107 under the rim 108 thereof to support the stack of cups 105. A coil spring 119 or the equivalent connects the outboard end of each of the shorter portions 113 to the shell 101 to bias the fingers 117 to their inward, engaged position with the cup lip 108. It will be understood that the hopper 103 may be filled with cups by any suitable method; as by hand, from a conventional cup-holding turret, etc. Also, the holder and finger mechanism may be part of a turret loader.

Figure 4:
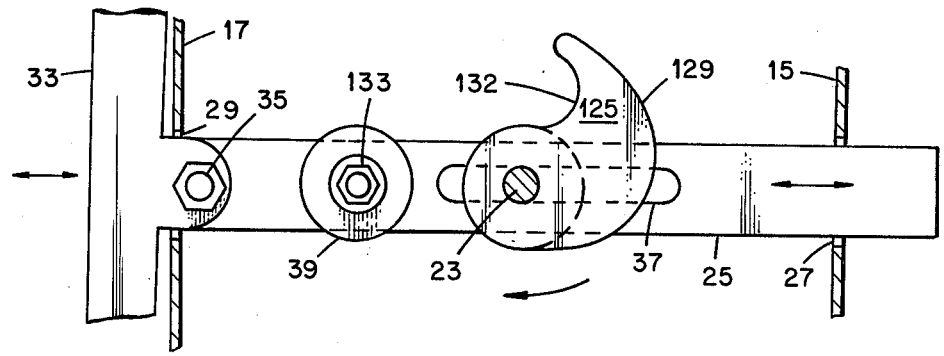
FIG. 4 is a drawing illustrating a cam mechanism for actuating one of the two gripping jaws of the dispenser shown in FIG. 1.
Figure 6:
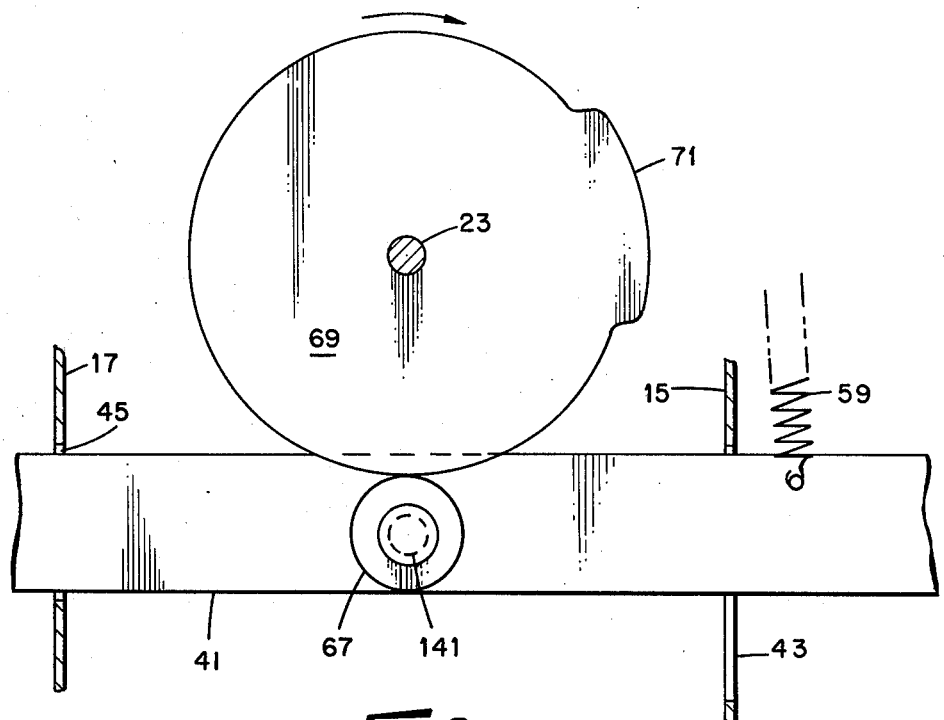
FIG. 6 is a drawing illustrating a cam mechanism for moving, in unison, both of the jaws of the dispenser shown in FIG. 1 in a substantially vertical direction.

A top view of the mechanism of FIG. 1 is shown in FIG. 2. In this view, a drive motor 121 is shown mounted on the exterior surface of the side wall 19. Electrical leads 120, 122 provide power to the motor 121. This motor 121, having appropriate speed reduction gearing, is connected to the shaft 23 for rotation thereof when the cup dispensing operation is activated, as by a conventional coinbox, for example. The several operating cam units attached to the shaft 23 with suitable fastening means (not shown), e.g., a set screw threaded in the cam and contacting the shaft, are visible in this view. Cam 69 was discussed hereinabove. A plate cam 123, identical to cam 69, is positioned on the second side of the beam 41 for purposes described hereinafter. Spaced between the cam 69 and the cam 123 are a pair of additional plate cams. Cam 125 engages the cam follower 39 on the beam 25 for achieving axial movement of the beam 25. A cam 127 engages the cam follower 65 on the arm 63 of the beam 41 for achieving axial movement of the beam 41. The details of these cams are shown in FIGS. 4–6 and are discussed hereinafter in connection with those figures.

Figure 3:
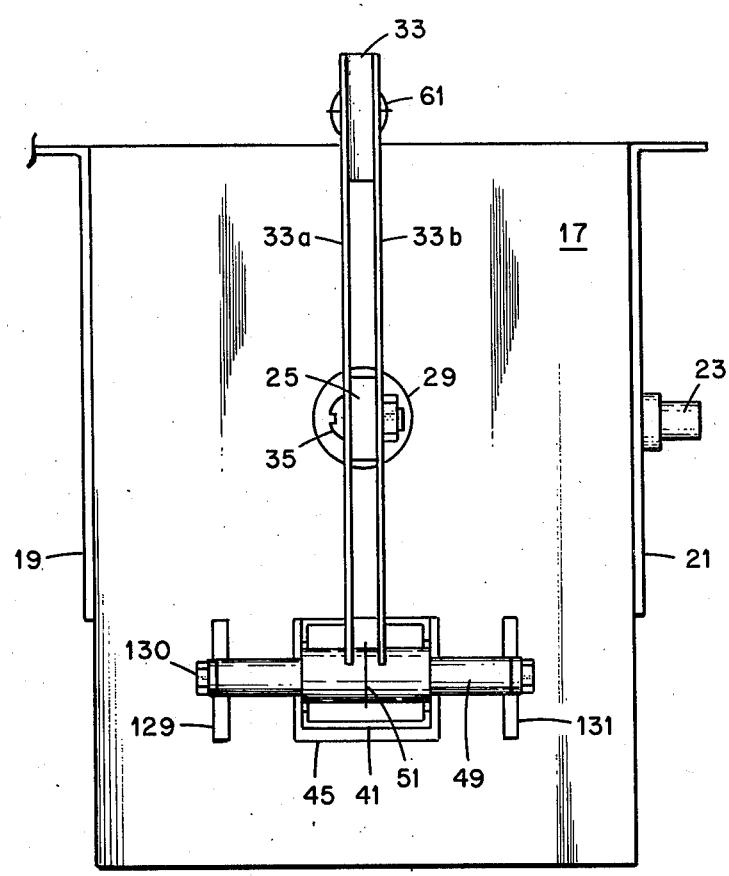
FIG. 3 is a rear view of the cup dispenser shown in FIG. 1 specifically illustrating a lever for operation of one of the jaws.

A rear elevational view of the mechanism frame is shown in FIG. 3. The beam 25 is embraced by the legs 33a, 33b of the vertical lever 33, and is attached thereto with the pivot fastener 35. The lower end of the lever 33 is rigidly attached to the cross member 49. The circular opening 29 in end wall 17 accommodates the reciprocation of the beam 25 and the pivot fastener 35. The end wall 17 is also provided with a pair of vertical slots 129, 131 spaced on opposite sides of the opening 45 for the beam 41. Ends of the flexible core extensions 93a, 93b of jaw 91 pass through these slots 129, 131 so as to be attached to the ends of the cross member 49 as with threaded fasteners 130.

An explanation of the cam motions will facilitate an understanding of the entire jaw mechanism operation. Referring to FIG. 4, the means for reciprocating beam 25 is shown. The plate cam 125, attached to the shaft 23, has an involute lobe 129 that has a recess 132 on its trailing edge. The leading edge of the lobe 129 during a portion of a revolution of the cam 125 contacts the cam follower 39. Since the beam 25 passes through the openings 27, 29 of the end walls 15, 17, respectively, further rotation of the cam 125 causes the lobe-follower contact to move the beam 25 axially rearward. This causes the lever 33 and the cross member 49 (see FIG. 1) to move rearward thereby exerting a pulling force on the core extensions 93a, 93b of the jaw 91 thereby moving the jaw 91 toward the jaw 73. This motion is opposed by the force of the aforementioned coil springs 51, 61. Thus, when the recess 132 of the lobe 129 is reached by the cam follower 39, the beam 25 is rapidly returned to its initial forward position and thereby moves the jaw 91 to its initial position. The position of the cam follower 39 is selectively set along the slot 31 by fastener 133 so as to adjust the length of the stroke of the beam 25 in accordance with the general size of the cups to be grasped.

Axial movement of the beam 41 is accomplished in a similar manner, as shown in FIG. 5. The plate cam 127, attached to the shaft 23 so as to rotate in the direction shown, has an involute lobe 135 with a recess 137 at the trailing edge. The cam 127 contacts the cam follower 65, rotatably held on the arm 63 with the fastening 139. As the lobe 135 advances, the beam 41 is axially moved in a forward direction. This motion, which moves the jaw 73 toward the jaw 91, is opposed by the force of the coil springs 51, 55. Thus when the recess 137 of the lobe 135 is reached by the cam follower 65, the beam 41 is rapidly returned to its initial rearward position, returning the jaw 73 to its fully open position.

The cam mechanism for pivotal movement of the beam 41, as required for pulling a cup downwardly from the hopper 103, is shown in FIG. 6. The plate cam 69, fastened to the shaft 23 to rotate in the direction indicated, has a uniform single lobe 71. This cam 69 engages the rotatable cam follower 67 attached to the side of the beam 41 with a fastener 141. When the lobe 71 contacts the cam follower 67, the forward end of the beam 41 is moved downwardly, pivoting at the opening 45 in the rear wall 17. This pivoting action of the beam 41 causes the jaws 73 and 91 to move, in unison, downwardly away from the hopper 103. In order to prevent axial twisting of the beam 41 during the pivoting action, an identical plate cam, cam 123 and associated cam follower (not shown) are located on the opposite side of the beam 41 (FIG. 2). The pivoting motion of the beam 41 is opposed by the coil springs 57, 59; thus, when the lobes 71 of the cams 69 and 123 are rotated past the cam followers 67, the beam 41 is returned rapidly upwardly to its original near-horizontal position. The relative rotational orientation of the cams 125 and 127 with the cams 69 and 123 are determined so that this upward return is synchronized to occur immediately after the jaws 73, 91 have opened through the rearward return of the beam 41 and forward return of the beam 25.

Figure 7:
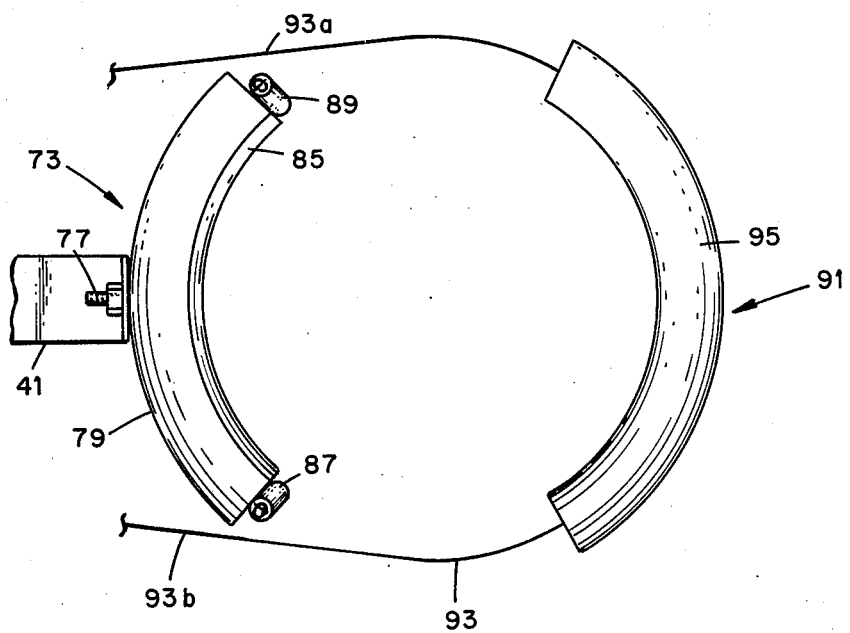
FIG. 7 is a top view of the gripping jaws of the cup dispenser shown in FIG. 1 in a retracted position with respect to a cup positioned therebetween.
Figure 8:
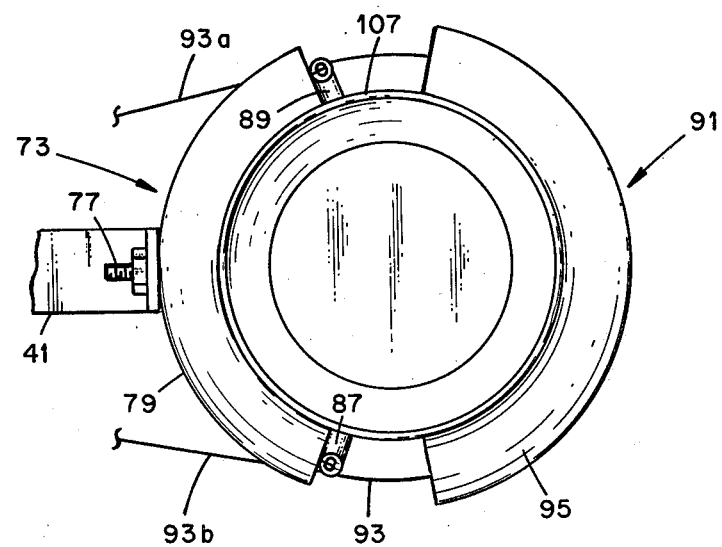
FIG. 8 is a top view of the jaws of FIG. 7 in a closed position as when gripping a cup.

As previously stated, the jaws 73, 91 of the invention are self-contouring, as illustrated particularly in FIGS. 7 and 8. The initial position of the jaws 73, 91 is shown in FIG. 7. Both of the jaws are generally opposed arcs, with radii greater than that of a cup to be grasped. As an axial pull is applied to both ends of the core extensions 93a, 93b, the jaw 91 moves rearwardly to first contact a point on the cup contour. As discussed above, this pull is achieved by the rearward movement of the beam 25 and the accompanying rearward movement of the cross member 49 to which the ends of the core extensions 93a, 93b are attached. Through simultaneous movement of the beam 41, the jaw 73 is moved forwardly toward the jaw 91. Thus, the center portions of sleeves 79, 85 initially contact the cup 107. During further closure of the jaws 73, 91, the extensions 93a, 93b of the core of jaw 91 bear against the cylindrical members 87, 89 which join the ends of the upper and lower portions of the jaw 73. The guide rollers 97, 99 assist in bringing the extensions 93a, 93b in contact with these cylindrical members 87, 89. This inward pressure by the extensions 93a and 93b causes the outer ends of the sleeves 79, 85 to move inwardly until the contours thereof substantially match that of the cup. The flexible core 93 and its sleeve 95 also assume the contour of the cup. The matching of the cup contour by the jaws 73, 91 assures a secure grasp of the cup even though the contour of the cup differs from that of another cup.

Having now described the operation of individual components of this embodiment, operation of the entire mechanism can be more fully understood, particularly with reference to FIGS. 9 through 11. In FIG. 9, the cup 107 is grasped by the jaws 73, 91, through the aforementioned operation of cams 125, 127. The cam 125 initiates forward axial movement of the beam 41 whereby the jaw 73 moves to contact the cup 107. Simultaneously, the cam 127 initiates rearward axial movement of the beam 25. This rearward movement moves the lever 33 away from the rear wall 17 thereby creating a pulling force on the core extensions 93a, 93b attached to the cross member 49 on the lever 33. As discussed above, the jaw contours are adjusted to achieve a contact on nearly the entire periphery of the cup 107. Also, as stated, the amount of grasping force exerted is adjustable by selecting a proper tension of the spring 61.

Referring now to FIG. 10, the beam 41, along with the jaws 73 and 91, is pivoted downwardly under the influence of the cam lobes 71 of the cams 69 and 123 against the cam followers 67. This pivoting action pulls the grasped cup 107 downwardly and away from the influence of the inwardly biased fingers 117 that had supported the cup. Under the influence of the springs 119 the fingers 117 return under the lip 108 of the next cup 143 thereby continuing to support the remaining stack of cups 105.

When the beam 41 reaches its most downward position, the beams 25 and 41 are returned to their initial axial positions as discussed above. This return opens the spacing between the jaws 73, 91 as shown in FIG. 11, thereby releasing the cup 107 for gravity descent to a filling position. Thereafter, the cam 69 and the cam 123 permit the beam 41 to return to the position indicated in FIG. 1, under the influence of the springs 57 and 59.

In a vending machine, the above operations are initiated by any desired set of command signals. For example, after an appropriate coin deposit and/or selection of a desired product at the vending machine console, the motor 121 is energized through leads 120, 122 from a suitable power source. The motor then rotates the shaft 23 one complete revolution before stopping. This revolution causes the jaws 73, 91 to dispense one cup, in the manner described above, from the hopper 103. Conventional relays and interlocks in a typical vending machine, such as those manufactured by the Seeburg Corporation, Chicago, Illinois, provide this control.

From the foregoing, it may be seen that a cup dispenser is provided that will securely grasp and dispense cups of varying configuration, size and materials of construction. Other objects having a substantially circular cross section and normally stored in a stacked configuration may be similarly dispensed. In addition, the mechanism requires very little manintenance and no adjustments are required when switching from one size up to another.

While a preferred embodiment has been shown and described, it will be understood that there is no intent to limit the invention by such disclosure, but rather, it is intended to cover all modifications and alternate constructions falling within the spirit and scope of the invention as defined in the appended claims.

I. claim:

1. A cup dispenser for removing a single cup from a stack of nested cups, which comprises:
   a frame;
   a hopper for receiving the stack of cups;
   displaceable support means secured to the hopper for engaging a lowermost cup of the stack and thereby supporting the stack of cups in the hopper;
   a first jaw unit and second jaw unit positioned in an opposed and cooperating postion adjacent to the hopper for grasping the lowermost cup, the jaw units being characterized by means mounting them to permit the flexible adjustment of their contours to the circumferential contour of the lowermost cup when the cup is grasped by the jaw units;
   jaw operating means supported by the frame and atached to the jaw units for sequentially moving the jaw units toward and away from each other to grasp and then release the lowermost cup; and
   elevating means supported by the frame and attached to the jaw units for moving the jaw units away from the hopper to pull the lowermost cup from the influence of the support means while the lowermost cup is grasped by the jaw units, and for returning the jaw units toward the hopper when the lowermost cup is released by the jaw units.

2. A cup dispenser as defined in claim 1 wherein the first jaw unit comprises:
   a first core member attached to the jaw operating means, the core being characterized by a preformed arc of radius greater than the radius of cups to be grasped, being flexible only in a substantially horizontal plane.

3. A cup dispenser as defined in claim 2, said first jaw unit further comprising a second core member attached to the jaw operating means vertically and laterally offset from the first core member by a distance sufficient that the relative orientation of the first and second core members generally matches a wall taper of the cup to be grasped, the second core member being characterized by a preformed arc of radius greater than the radius of cups to be grasped, being flexible only in a substantially horizontal plane.

4. The cup dispenser of claim 1 wherein the second jaw unit comprises a core member characterized by being a preformed arc of radius greater than the radius of cups to be grasped, being flexible only in a substantially horizontal plane, and flexible extensions at each end of the third core member connecting the third core member to the jaw operating means, the extensions being characterized by being flexible.

5. The cup dispenser of claims 2, 3 or 4 wherein each of the core members comprises a flexible, non-elastic band, and a resilient tubular sleeve surrounds each flexible band.

6. The dispenser of claim 1 wherein the displaceable support means comprises a plurality of resiliently-biased pivoted levers, each lever being provided with a radially-inward directed finger to engage the lowermost cup, whereby the lever and finger are pivoted outwardly when the lowermost cup is pulled from the hooper by the jaw units, and are returned to their initial position to grasp the adjoining cup in the stack.

7. The cup dispenser of claim 1 wherein the jaw operating means comprises:
   a first reciprocating means attached to the first jaw unit;
   a second reciprocating means attached to the second jaw unit; and
   synchronizing means for the first and second reciprocating means to operate the first and second jaw units in unison.

8. The cup dispenser of claim 7 wherein the synchronizing means comprises a rotatable shaft journaled in the frame, a first cam and a second cam axially mounted upon said shaft for rotation, a first cam follower operatively connected to the first jaw unit and in contact with said first cam, a second cam follower operatively connected to said second jaw unit and in contact with said second cam.

9. The cup dispenser of claim 8 wherein the elevating means comprises a third cam axially mounted upon and rotatable by the shaft, a third cam follower operatively connected to the first and second jaw units and in contact with the third cam, the third cam being provided with a single uniform lobe to press against the third cam follower to move the first and second jaw units away from the hopper; and resilient biasing means for opposing the movement of the jaw units away from the hopper and for returning the jaw units toward the hopper, the third cam being synchronized with the first and second cams so as to move the jaw units away from the hopper after the jaw units are moved toward one another to grasp the cup and returning the jaw units toward the hopper after the jaw units are spread apart to release a grasped cup.

* * * * *

UNITED STATES PATENT AND TRADEMARK OFFICE
CERTIFICATE OF CORRECTION

PATENT NO. : 4,327,843

DATED : May 4, 1982

INVENTOR(S) : Dewey A. Corley

It is certified that error appears in the above—identified patent and that said Letters Patent is hereby corrected as shown below:

Column 3, line 33 "frt" should be -- front --

Column 7, line 13 "manintenance" should be -- maintenance --

Column 7, line 15 "up" should be -- cup --

Column 7, line 38, "atached" should be -- attached --

Signed and Sealed this

Twenty-ninth Day of June 1982

|SEAL|

Attest:

Attesting Officer

GERALD J. MOSSINGHOFF

Commissioner of Patents and Trademarks